United States Patent Office 3,159,649
Patented Dec. 1, 1964

3,159,649
2-OXY-5-(6-OXY - 2-NAPHTHYL)CYCLOPENTANE-
ALKANOIC ACIDS, THEIR ESTERS, AND COR-
RESPONDING LACTONES
Edward A. Brown, Wilmette, and Leland J. Chinn,
Morton Grove, Ill., assignors to G. D. Searle & Co.,
Chicago, Ill., a corporation of Delaware
No Drawing. Filed Nov. 14, 1960, Ser. No. 68,630
11 Claims. (Cl. 260—343.3)

This invention relates to 2-oxy-5-(oxy-2-naphthyl)cy-clopentanealkanoic acids, their esters, lactones corresponding, and processes for the manufacture thereof. More particularly, this invention relates to hydroxy acids and their esters of the formula

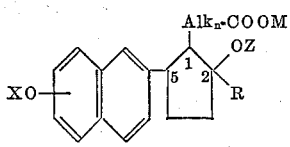

wherein $Alk_n$ represents an optional alkylene radical; M represents hydrogen or an alkyl or dialkylaminoalkyl radical; Z represents hydrogen or an alkanoyl radical; R represents hydrogen or an alkyl, alkoxycarbonylalkyl, or alkynyl radical; and X represents hydrogen or an alkyl radical. When the alkylene radical represented by $Alk_n$ in the foregoing formula separates the groups attached thereto by, for example, 1 or 2 carbon atoms and is in cis relationship to the group represented in the formula by OZ, ring closure to form compounds of the formula

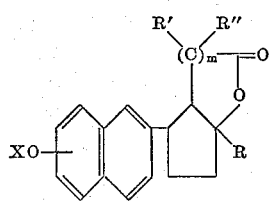

is possible, R' and R'' each representing hydrogen or an alkyl radical, m representing a small positive integer most commonly less than 3, and R and X retaining the meanings assigned above. The resultant lactones, like the hydroxy acids aforesaid, are products to which the present invention particularly relates.

Among the alkylene radicals represented by $Alk_n$, especially methylene, ethylene, trimethylene, 1,2-propylene, 2,2-dimethyl-1,3-propylene tetramethylene and like bivalent, saturated, acyclic, straight- or branched-chain hydrocarbon groupings are preferred. When no such grouping is present, the compounds hereof are cyclopentane-carboxylic acids and esters, the COO radical in the above formulas being attached directly to the alicyclic nucleus.

The alkyl radicals represented by M, R, R', R'', and X hereinbefore are preferably lower alkyl radicals, which is to say methyl, ethyl, propyl, isopropyl, butyl, isobutyl, sec-butyl, tert-butyl, pentyl, tert-pentyl, neopentyl, hexyl, isohexyl, heptyl, octyl, and homologous aliphatic groupings embracive of fewer than 9 carbon atoms.

The dialkylaminoalkyl radicals represented by M and the alkanoyl radicals represented by Z likewise are most desirably of lower order, by which is meant that the alkyl constituents thereof individually comprise no more than 8 carbon atoms, as illustrated in the preceding paragraph.

Finally, the alkoxycarbonylalkyl and alkynyl radicals represented by R are optimally methoxycarbonylmethyl and ethynyl radicals, respectively, although the higher homologs of these radicals also will serve for the purposes of this invention.

It follows from the above, and because the radicals set forth are unexceptionably named in accordance with recommendations of the International Union of Pure and Applied Chemistry and Chemical Abstracts (Cf. specifically Section 75 of the Introduction, With Key and Discussion of the Naming of Chemical Compounds for Indexing, Chemical Abstracts, 39, 5867 ff., with respect to compound radical names), that those skilled in the art will understand by the term "an alkylene radical" as used herein exclusively a radical of the formula $$-C_pH_{2p}-$$

by "a lower alkyl radical" exclusively a radical of the formula $$-C_qH_{2q+1}$$

by "a di(lower alkyl)amino(lower alkyl) radical" exclusively a radical of the formula $$-C_qH_{2q}N(C_qH_{2q+1})_2$$

by "a lower alkanoyl radical" exclusively a radical of the formula $$-COC_qH_{2q+1}$$

by "a methoxycarbonylmethyl radical" exclusively a radical of the formula $$-CH_2COOCH_3$$

and by "an ethynyl radical" exclusively a radical of the formula $$-C\equiv CH$$

$p$ and $q$ in these formulas representing, respectively, any positive integer and a positive integer amounting to less than 9.

The compounds to which this invention relates are useful because of their valuable pharmacological properties. For example, they block the effect of desoxycorticosterone acetate on urinary sodium and potassium and inhibit the assimilation of mevalonate ions by the cholesterologenic mechanism of the animal body. [See J. Lipid Research, 1, 1 (1959).]

Since the carbon atoms numbered 1, 2, and 5 in the first formula of this specification are asymmetric, the hydroxy acids of the invention exist in a minimum of four racemic and eight optically active forms. For stereochemical reasons previously referred to, the corresponding lactones exist in a minimum of two racemic and four optically active forms. The relative pharamacological potency of these divers forms can and does vary.

Manufacture of the subject compounds proceeds generally as follows, definitions of the various symbols used in the formulas depicted remaining as above:

An appropriate 2-oxo-5-(oxy-2-naphthyl)cyclopentane-alkanoic acid or ester of the formula

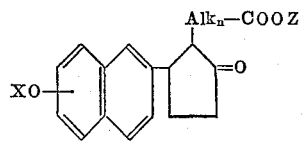

is reduced with sodium borohydride or the equivalent to give the corresponding hydroxy acid

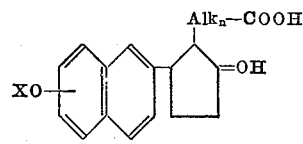

which, in turn, is esterified as with a selected diazoalkane or dialkylaminoalkyl halide to give a corresponding alkanoate

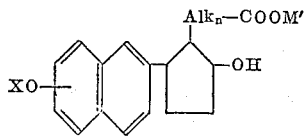

wherein M' represents an alkyl or dialkylaminoalkyl radical. Any hydroxy group present is esterified with pyridine and an alkanoic acid anhydride, representatively as in Examples 7, 8, and 19C hereafter. Alternatively, an ester linkage is saponified as illustrated in Examples 15, 18, and 20.

The 2-alkyl hydroxy acids hereof eventuate from a 5-(alkoxy-2-naphthyl)-2-oxocyclopentanoic acid of the formula

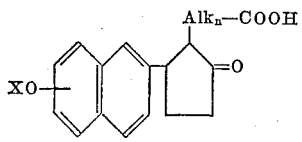

upon treatment with an alkylmagnesium halide in ethereal solvent followed by hydrolysis, as demonstrated in Example 11. Substitution for the alkylmagnesium halide of an appropriate alkynylmagnesium halide—illustratively formed in situ as described in Examples 13—affords the corresponding 2-alkynyl hydroxy acids thereof.

The 2-alkoxycarbonylalkyl compounds comprehended derive from a 5-(alkoxy-2-naphthyl)-2-oxocyclopentanealkanoate of the formula

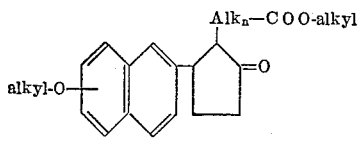

upon treatment with an appropriate alkoxycarbonylalkyl halide as, for instance, in Example 12A.

A further means of producing the cyclopentanepropionic acids and their esters of this invention consists in lengthing the acid side-chain of a suitable cyclopentaneacetic acid by seriatim treatment with oxalyl chloride, diazomethane, and silver oxide, as detailed in Example 14.

Likewise another means to the cyclopentanecarboxylic acids and their esters hereof consists in shortening the acid side-chain of a suitable cyclopentaneacetic acid ester by seriatim treatment with phenylmagnesium bromide, iodine, pyridine-acetic anhydride, and chromium trioxide in acetic acid, according to the so-called Barbier-Wieland degradation procedure illustrated in Example 19.

The lactones of this invention derive from hydroxy acids stereochemically adapted to their formation as aforesaid upon standing in acid media. These lactones, in turn, are readily converted to equivalent salts of the corresponding hydroxy acids upon contact with appropriate aqueous bases, for example, KOH, NaOH, NH₄OH, Ca(OH)₂, etc.; and the salts give back the hydroxy acids when exposed for a critically brief period of time to acid.

A variety of means exist for obtaining optically active forms of the products of this invention. Where a product occurs in crystals with apparently differing arrangements of the faces, manual separation of the isomers is possible. Alternatively, such of the products as are fermented by bacteria or molds will be found to undergo this fermentation at varying rates, and appropriate selections of the microorganisms involved enable preparation of one or either enantiomorph by destruction of the other. Yet another widely-recognized method of resolving racemic products of the type herein disclosed consists in preparing salts thereof with optically active bases and taking advantage of the differential solubilities of these salts to effect their separation, followed by freeing of the constituent stereospecific isomer with acid. Example 1 herein, Parts C through E, illustrates this technique. Finally, one can proceed from optically active starting materials to optically active final products as in Example 3B.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are at 25° C. referred to the D line of sodium.

*Example 1*

A. *2-hydroxy-5-(6-methoxy-2-naphthyl)cyclopentaneacetic acid.*—To a solution of 194 parts of 5-(6-methoxy-2-naphthyl)-2-oxocyclopentaneacetic acid (M.P. 137–139°) in 7760 parts of aqueous 5% sodium hydroxide is added, cautiously with agitation, 97 parts of sodium borohydride. Agitation is continued for a total of 18 hours, during the final 20 minutes of which 582 parts of glacial acetic acid is introduced. Sufficient dilute hydrochloric acid is added to adjust the pH to 4, whereupon the resultant mixture is warmed briefly to 60° and then partitioned between ethyl acetate and aqueous 10% potassium bicarbonate.

The bicarbonate phase is washed with ether, freed of dissolved ether by boiling, filtered, and acidified with dilute hydrochloric acid to precipitate a solid product which, collected on a filter funnel, washed thereon with water, dried in air, and recrystallized from acetonitrile, melts at 139–141°. This material is 2-hydroxy-5-(6-methoxy - 2 - naphthyl)cyclopentaneacetic acid, of the formula

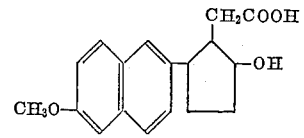

The product is racemic, being composed of a pair of enantiomorphs.

B. *2 - hydroxy-5-(6-methoxy-2-naphthyl)cyclopentaneacetic acid lactone.*—The acetate phase obtained from the partitioning described in the foregoing Part A of this example is washed with water and stripped of solvent by vacuum distillation, leaving a solid residue which is chromatographed in benzene solution on silica gel, using benzene and ethyl acetate as developing solvents. Evaporation of the eluate comprising 95% benzene and 5% ethyl acetate affords a solid residue which, recrystallized from ethyl acetate, melts at 177–182°. This material is 2 - hydroxy-5-(6-methoxy-2-naphthyl)cyclopentaneacetic acid lactone, of the formula

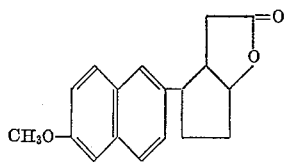

Hydrolysis of this lactone yields a hydroxy acid composed of enantiomorphs individually diastereomeric with those which compose the product of the preceding Part A of this example.

C. *2 - hydroxy-5-(6-methoxy-2-naphthyl)cyclopentaneacetic acid amphetamine salts.*—A solution of 2 parts of 2-hydroxy-5-(6-methoxy - 2 - naphthyl)cyclopentaneacetic acid (M.P. 139–141°) and 1 part of d-amphetamine in 400 parts of acetone is heated at the boiling point under reflux for ½ hour. Upon cooling, a mixture of the d-amphetamine salts of dextrorotatory 2-hydroxy-5-(6-methoxy-2-naphthyl)cyclopentaneacetic acid and levorotatory 2-hydroxy-5-(6-methoxy-2-naphthyl)cyclopentaneacetic acid is precipitated, the d-amphetamine dextro acid salt being preponderant. The mixture melts at 164–166° and has a specific rotation of +1° (2% in 95% ethanol). Systematic fractional crystallization of this mixture from acetone affords in greater amount the less soluble d-amphetamine salt of dextrorotatory 2-hydroxy-5-(6-methoxy-2-naphthyl)cyclopentaneacetic acid melting at 183–184° and with a specific rotation of +21° (2% in 95% ethanol), and in lesser amount the more soluble d-amphetamine salt of levorotatory 2-hydroxy-5-(6-methoxy-2-naphthyl)cyclopentaneacetic acid melting at 180–181° and having a specific rotation of −21° (2% in 95% ethanol).

Substitution of 1 part of l-amphetamine for the d-amphetamine called for in the preceding paragraph affords, by the procedure there detailed, the less soluble l-amphetamine salt of levorotatory 2-hydroxy-5-(6-methoxy-2-naphthyl)cyclopentaneacetic acid melting at 183–184° and with a specific rotation of −21° (2% in 95% ethanol), and the more soluble l-amphetamine salt of dextrorotatory 2-hydroxy-5-(6-methoxy-2-naphthyl)cyclopentaneacetic acid melting at 180–181° and with a specific rotation of +21° (2% in 95% ethanol).

D. *2 - hydroxy-5-(6-methoxy-2-naphthyl)cyclopentaneacetic acid.*—A solution of 1 part of the d-amphetamine salt of dextrorotatory 2-hydroxy-5-(6-methoxy-2-naphthyl)cyclopentaneacetic acid (M.P. 183–184°) in 10 parts of aqueous 1% sodium hydroxide is warmed briefly and then acidified with 6% hydrochloric acid. The solid precipitate thrown down is dextrorotatory 2-hydroxy-5-(6-methoxy-2-naphthyl)cyclopentaneacetic acid which, recrystallized from acetonitrile, is obtained as colorless needles melting at 146–147° and having a specific rotation of +21° (2% in 95% ethanol). This material is one of the two enantiomorphs which compose the product of Example 1A.

E. *2 - hydroxy-5-(6-methoxy-2-naphthyl)cyclopentaneacetic acid.*—Substitution of 1 part of the l-amphetamine salt of levorotatory 2-hydroxy-5-(6-methoxy-2-naphthyl)cyclopentaneacetic acid for the d-amphetamine salt of dextrorotatory 2 - hydroxy - 5-(6-methoxy-2-naphthyl)-cyclopentaneacetic acid called for in the preceding Part D of this example affords, by the procedure there detailed, levorotatory 2-hydroxy-5-(6-methoxy-2-naphthyl)cyclopentaneacetic acid. This material is the enantiomorph of the product of Example 1D.

EXAMPLE 2

A. *Methyl 2 - (6-methoxy-2-naphthyl)-5-oxo-1-cyclopenteneacetate.*—To a solution of 120 parts of 2-(6-methoxy-2-naphthyl)-5-oxo-1-cyclopenteneacetic acid in 900 parts of aqueous 10% sodium hydroxide is added, with agitation during ½ hour at 45–50°, approximately 125 parts of dimethyl sulfate, following which 2000 parts of aqueous 2% sodium hydroxide and 510 parts of dimethyl sulfate are concurrently added during 1½ hours, agitation being continued and 45–50° temperatures being maintained. The resultant mixture is cooled to room temperature, and the dark brown solid precipitate is filtered off and washed with water. Recrystallization of this material from aqueous methanol, using decolorizing charcoal in process, affords methyl 2-(6-methoxy-2-naphthyl)-5-oxo-1-cyclopenteneacetate as a tan solid melting at 103–110°.

B. *Methyl 5 - (6-methoxy-2-naphthyl)-2-oxocyclopentaneacetate.*—To a solution of 460 parts of methyl 2-(6-methoxy-2-naphthyl)-5 - oxo - 1 - cyclopenteneacetate in 5750 parts of methanol is added approximately 35 parts of 5% palladium-on-charcoal catalyst. The resultant mixture is maintained at 70° with agitation under hydrogen at 3–8 atmospheres pressure until hydrogen uptake indicates that saturation of the cyclopentene double bond is complete, whereupon the mixture is filtered while still warm and approximately 3 parts of sodium methoxide is dissolved in the filtrate. From the filtrate, cooled and let stand, methyl 5-(6-methoxy-2-naphthyl)-2-oxocyclopentaneacetate precipitates and is separated from the mother liquor by filtration. The product melts at 103–105°.

C. *2 - hydroxy-5-(6-methoxy-2-naphthyl)cyclopentaneacetic acid lactone.*—The motor liquor remaining after separation of methyl 5-(6-methoxy-2-naphthyl)-2-oxo-5-cyclopentaneacetate in the foregoing Part B of this example is concentrated to approximately ⅙ its original volume, then diluted with a solution of 25 parts of potassium hydroxide in 200 parts of water. The resultant solution is heated at around 90° for 2 hours, during which time sufficient water is added to maintain constant volume. The solution is then concentrated to approximately ½ its original volume by vacuum distillation, cooled, and made acid with dilute hydrochloric acid. The gummy mass which separates is isolated by decanting the liquid therefrom. It is then taken up in 400 parts of acetone, and to this solution 24 parts of concentrated hydrochloric acid is added. The resultant mixture is heated briefly at the boiling point and then concentrated under nitrogen to approximately ⅙ its original volume. Approximately 450 parts of benzene is thereupon introduced; and the solution thus obtained is washed with water, then with aqueous 5% sodium bicarbonate, and finally with water again. The solution is then dried over magnesium sulfate and stripped of solvent by evaporation under nitrogen. The gummy residue, recrystallized from methanol using decolorizing charcoal in process, affords 2-hydroxy-5-(6-methoxy-2-naphthyl)cyclopentaneacetic acid lactone melting at approximately 140.5–141.5°. Hydrolysis of this lactone yields a hydroxy acid composed of enantiomorphs individually diastereomeric with those which compose the hydroxy acid giving rise to the lactone of Example 1B, and likewise diastereomeric with the enantiomorphs present in the hydroxy acid of Example 1A.

EXAMPLE 3

A. *Methyl 2-hydroxy-5-(6-methoxy-2-naphthyl)cyclopentaneacetate.*—To a suspension of 65 parts of 2-hydroxy-5-(6-methoxy-2 - naphthyl)cyclopentaneacetic acid (M.P. 139–141°) in 710 parts of ether is slowly added, with agitation at about 5°, a solution of 25 parts of diazomethane in 710 parts of ether. The reaction mixture is maintained at about 5° for 2½ hours, then filtered to remove a trace of insoluble matter and finally stripped of solvent by distillation under nitrogen. The oily residue solidifies on standing. Recrystallized from a mixture of ether and hexane, it melts at 71–74°. The product thus obtained is methyl 2-hydroxy-5-(6-methoxy-2-naphthyl)-cyclopentaneacetate, of the formula

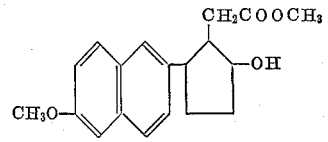

B. *Methyl 2 - hydroxy-5-(6-methoxy-2-naphthyl)cyclopentaneacetate.*—Substitution of dextrorotatory 2-hydroxy - 5-(6-methoxy-2-naphthyl)cyclopentaneacetic acid (M.P. 146–147°) for the 2-hydroxy-5-(6-methoxy-2-naphthyl)cyclopentaneacetic acid called for in the foregoing Part A of this example affords, by the procedure there detailed, dextrorotatory methyl 2-hydroxy-5-(6-methoxy-2-naphthyl)cyclopentaneacetate melting at approximately 107–108° and with a specific rotation of +3.5 (2% in 95% ethanol). This material is one of two enantiomorphs which compose the product of the preceding Part A of this example.

EXAMPLE 4

*Butyl 2 - hydroxy-5-(6-methoxy-2-naphthyl)cyclopen-* taneacetate.—To a suspension of 2 parts of 2-hydroxy-5-(6-methoxy-2-naphthyl)cyclopentaneacetic acid (M.P. 139–141°) in 140 parts of anhydrous ether is added, with agitation at about 5°, a solution of 16 parts of diazobutane in 210 parts of anhydrous ether. The resultant mixture is maintained at about 5° overnight, by which time solution has occurred. Solvent is removed by vacuum distillation, leaving as the residue a clear, pale yellow oil, the desired butyl 2-hydroxy-5-(6-methoxy-2-naphthyl)cyclopentaneacetate. The product has the formula

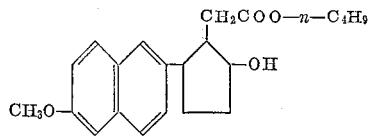

EXAMPLE 5

*2 - diethylaminoethyl 2 - hydroxy-5-(6-methoxy-2-naphthyl)cyclopentaneacetate.*—A solution of 2 parts of 2-hydroxy-5-(6-methoxy - 2 - naphthyl)cyclopentaneacetic acid (M.P. 139–141°) and 1 part of 2-diethylaminoethyl chloride in 11 parts of 2-propanol is heated at the boiling point under reflux for 2½ hours, then diluted with 140 parts of water, made basic with dilute aqueous sodium hydroxide, and extracted with ether. The ether extract is washed with brine, dried over anhydrous sodium sulfate, and stripped of solvent by distillation. The oil which remains is freed of any residual moisture by heating at around 90° for 15 minutes in vacuo. It is then taken up in 70 parts of anhydrous ether, and the ether solution is made acid with a slight excess of absolute ethanolic hydrogen chloride. The viscous precipitate thrown down forms tacky crystals on standing 24 hours at 5°. The crystals are separated by decanting the mother liquors and partitioned between dilute aqueous sodium hydroxide and ether. The ether phase is separated and freed of solvent by distillation. The residue crystallizes from hexane as white needles melting at 50–52°. The product thus obtained is 2-diethylaminoethyl 2-hydroxy-5-(6-methoxy - 2 - naphthyl)cyclopentaneacetate, of the formula

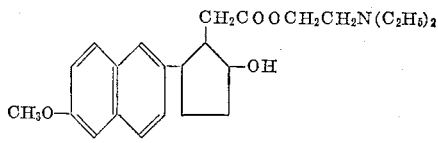

EXAMPLE 6

*2-dimethylaminopropyl 2-hydroxy - 5 - (6-methoxy-2-naphthyl)cyclopentaneacetate.*—Substitution of 2 parts of 2-dimethylaminopropyl chloride for the 2-diethylaminoethyl chloride called for in the preceding Example 5 affords, by the procedure there detailed, 2-dimethylaminopropyl 2-hydroxy-5-(6-methoxy - 2 - naphthyl)cyclopentaneacetate, of the formula

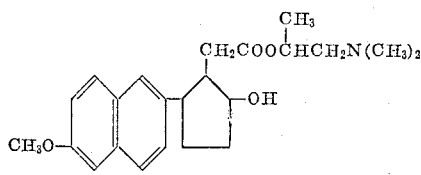

EXAMPLE 7

*2-acetoxy-5-(6 - methoxy - 2 - naphthyl)cyclopentaneacetic acid.*—To a solution of 8 parts of 2-hydroxy-5-(6-methoxy-2-naphthyl)cyclopentaneacetic acid (M.P. 139–141°) in 80 parts of pyridine is added 100 parts of acetic anhydride. The resultant mixture is let stand at room temperatures for 17 hours, then poured into ice water. The solid which precipitates is collected on a filter and washed thereon with water, whereupon it is taken up in 50 parts of pyridine. Water is added to the pyridine solution until precipitation is imminent, and the resultant solution is allowed to stand at room temperatures 1½ hours. It is then diluted with 5 volumes of ice water, causing precipitation of a solid which is collected on a funnel, washed thereon with water, and dried in air. Recrystallization of this material from a mixture of acetone, benzene, and hexane affords 2-acetoxy-5-(6-methoxy-2-naphthyl)cyclopentaneacetic acid as colorless laths melting at approximately 153–154°. The product has the formula

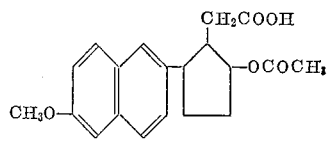

EXAMPLE 8

*Methyl 2-acetoxy-5-(6-methoxy - 2 - naphthyl)cyclopentaneacetate.*—A solution of approximately 1 part of methyl 2-hydroxy-5-(6-methoxy - 2 - naphthyl)cyclopentaneacetate (M.P. 71–74°) in 30 parts of pyridine and 15 parts of acetic anhydride is heated at 100° for 15 minutes, then cooled and diluted with 50 parts of water. The precipitate which forms is isolated by filtration and recrystallized from acetone. The product thus obtained is methyl 2-acetoxy-5-(6-methoxy-2-naphthyl)cyclopentaneacetate melting at 147–149° and having the formula

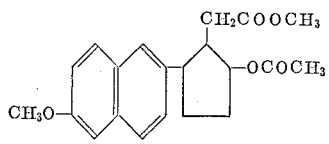

EXAMPLE 9

A. *5-(6-hydroxy - 2 - naphthyl) - 2 - oxocyclopentaneacetic acid.*—A mixture of 2 parts of 5-(6-methoxy-2-naphthyl) - 2 - oxocyclopentaneacetic acid (M.P. 137–139°) and 10 parts of freshly distilled pyridine hydrochloride is heated at 180–185° for 2 hours in a nitrogen atmosphere. It is then cooled and diluted with 20 parts of water. The gummy product which separates is extracted with ether. The ether extract, in turn, is extracted with dilute aqueous sodium bicarbonate. The bicarbonate extract is acidified with dilute hydrochloric acid, precipitating a crystalline product which is filtered off, dried in air, and recrystallized from a mixture of ethyl acetate and hexane. The resultant material is 5-(6-hydroxy-2-naphthyl)-2-oxocyclopentaneacetic acid melting at 170–172°.

B. *2 - hydroxy - 5-(6-hydroxy-2-naphthyl)cyclopentaneacetic acid.*—To a solution of 93 parts of 5-(6-hydroxy-2-naphthyl)-2-oxocyclopentaneacetic acid (M.P. 170–172°) in 3680 parts of aqueous 5% sodium hydroxide is added 46 parts of sodium borohydride. The resultant mixture is maintained with agitation at room temperatures for 18 hours, then hydrolyzed by cautiously adding 280 parts of glacial acetic acid followed by sufficient concentrated hydrochloric acid to acidify. The mixture thus obtained is concentrated in vacuo to approximately ½ its original volume, during which a gummy solid separates. The solid is taken up in 500 parts of methanol, and to the methanol solution is added 30 parts of concentrated hydrochloric acid and 20 parts of water. The resultant mixture is let stand at room temperatures for 2 hours and then diluted with a further 2500 parts of water. The mixture thus obtained is partitioned between ether and dilute aqueous potassium bicarbonate. The bicarbonate phase is separated and acidified with dilute hydrochloric acid, causing precipitation of a gummy solid which is recrystallized from water. This material is 2-hydroxy-5-(6- hydroxy-2-naphthyl)cyclopentaneacetic acid melting at 161–170° and having the formula

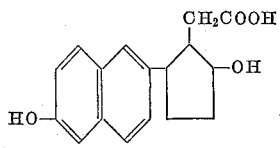

C. *2 - hydroxy-5-(6-hydroxy-2-naphthyl)cyclopentaneacetic acid lactone.*—The ether phase obtained from the partitioning procedure described in the foregoing Part B of this example is washed with water, dried over sodium sulfate, and stripped of solvent by vacuum distillation. The oily residue is further purified by chromatographing in benzene solution on silica gel, using benzene and ethyl acetate as developing solvents. From the eluate comprising 85% benzene and 15% ethyl acetate, on evaporation of solvent, the desired 2-hydroxy-5-(6-hydroxy-2-naphthyl)cyclopentaneacetic acid lactone is obtained as an oil. The product has the formula

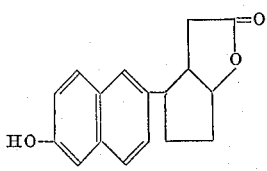

Hydrolysis of this lactone yields a hydroxy acid composed of enantiomorphs individually diasteromeric with those which compose the product of the preceding Part B of this example.

EXAMPLE 10

*Methyl 2 - hydroxy-5-(6-hydroxy-2-naphthyl)cyclopentaneacetate.*—To a solution of 63 parts of 2-hydroxy-5-(6-hydroxy-2-naphthyl)cyclopentaneacetic acid (M.P. 161–170°) in 700 parts of ether is added, with agitation at 0–5°, a solution of 27 parts of diazomethane in 1260 parts of ether. The resultant mixture is maintained with agitation at 0–5° for 30 minutes, then diluted with 1400 parts of tetrahydrofuran. Agitation is continued for a further 30 minutes, the reaction mixture being allowed to warm to room temperature during this time. The mixture is then filtered to remove a trace of insoluble material, and the filtrate is concentrated to 1/10 its original volume by distillation under nitrogen. Upon addition of 3500 parts of water to the concentrate, an oil is thrown down, which is purified by extraction into ether and reprecipitation with hexane. Supernatant solvent is decanted, and residual solvent is removed from the purified oil by heating it in vacuo under nitrogen. The material thus isolated is methyl 2-hydroxy-5-(6-hydroxy-2-naphthyl)cyclopentaneacetate, of the formula

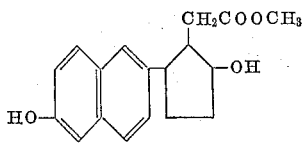

EXAMPLE 11

A. *2-hydroxy-5-(6-methoxy-2-naphthyl)-2-methylcyclopentaneacetic acid.*—To a mixture of 28 parts of 5-(6-methoxy-2-naphthyl)-2-oxocyclopentaneacetic acid (M.P. 137–139°) in 350 parts of redistilled tetrahydrofuran is added 23 parts of methylmagnesium bromide dissolved in 45 parts of ether. Solvent boiling below 60° is removed by distillation, whereupon the concentrate which remains is heated at the boiling point under reflux for 30 minutes. It is then cooled and hydrolyzed by the addition of 150 parts of 10% hydrochloric acid. Tetrahydrofuran is thereupon removed by vacuum distillation; and the aqueous residue, containing a gummy solid, is partitioned between aqueous sodium bicarbonate and ether. The bicarbonate phase is separated and acidified with dilute hydrochloric acid. The solid product thrown down is filtered off and chromatographed in benzene solution on silica gel, using benzene and ethyl acetate as developing solvents. From the eluate comprising 70% benzene and 30% ethyl acetate, upon evaporation of solvent, there is obtained a residue which, recrystallized from a mixture of ethyl acetate and hexane, melts at 144–150°. This material is 2-hydroxy-5-(6-methoxy-2-naphthyl)-2-methylcyclopentaneacetic acid, of the formula

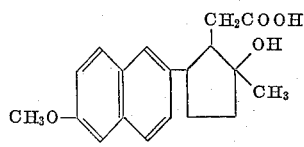

B. *2-hydroxy-5-(6-methoxy-2-naphthyl)-2-methylcyclopentaneacetic acid lactone.*—The ether phase obtained from the partitioning described in the preceding Part A of this example is washed with water and then stripped of solvent by distillation. The residue, recrystallized from ethyl acetate, melts at 131–133°. This material is 2-hydroxy - 5 - (6-methoxy-2-naphthyl)-2-methylcyclopentaneacetic acid lactone, of the formula

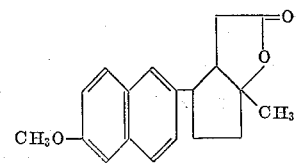

Hydrolysis of this lactone yields a hydroxy acid composed of enantiomorphs individually diastereomeric with those which compose the product of the preceding Part A of this example.

EXAMPLE 12

A. *2 - hydroxy-5-(6-methoxy-2-naphthyl)-1,2-cyclopentanediacetic acid dimethyl ester.*—A mixture of 4 parts of methyl 5-(6-methoxy-2-naphthyl)-2-oxocyclopentaneacetate (M.P. 103–105°), 3 parts of methyl bromoacetate, 4 parts of activated (with 20% hydrochloric acid) 20-mesh zinc pellets, 42 parts of anhydrous ether, and 54 parts of anhydrous benzene is heated at the boiling point under reflux for 11 hours, a few crystals of iodine being added at the outset to initiate reaction. During the first 7 hours of the heating period, an additional 5 parts of methyl bromoacetate is added in two equal portions and an additional 12 parts of activated 20-mesh zinc pellets in three equal portions. Following boiling, the reaction mixture is let stand at room temperatures for 11 hours and then made slightly acidic with glacial acetic acid. The supernatant liquid is decanted from unreacted zinc and diluted with ether. The ethereal solution is washed successively with water, dilute aqueous ammonium hydroxide, water, and saturated aqueous sodium chloride, whereupon it is dried over anhydrous sodium sulfate and finally freed of solvent by vacuum distillation. The viscous brown oil which remains is chromatographed on silica gel, using benzene and ethyl acetate as developing solvents. From eluates comprising 90% benzene and 10% ethyl acetate, two products are obtained upon evaporation of solvent, the one being more polar than the other. The more polar product, recrystallized from ether, melts at approximately 142–143°. This material is 2-hydroxy-5-(6-methoxy-2-naphthyl)-1,2-cyclopentanediacetic acid dimethyl ester, of the formula

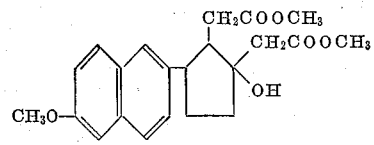

B. *2-hydroxy-2-methoxycarbonylmethyl-5-(6-methoxy-2-naphthyl)cyclopentaneacetic acid lactone.*—The less polar product isolated by the chromatographic procedure described in the foregoing Part A of this example, upon recrystallization from methanol, melts at approximately 101.5–102.5°. This material is 2-hydroxy-2-methoxycarbonylmethyl - 5-(6-methoxy-2-naphthyl)cyclopentaneacetic acid lactone, of the formula

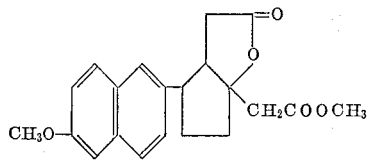

The product is epimeric at carbon atom number 2 vis-a-vis the product of the preceding Part A of this example.

EXAMPLE 13

A. *2 - ethynyl-2-hydroxy-5-(6-methoxy-2-naphthyl)cyclopentaneacetic acid lactone.*—To 210 parts of tetrahydrofuran, saturated with acetylene and through which acetylene is continuously passed during the ensuing 5½ hours, a solution of 20 parts of ethylmagnesium bromide in 238 parts of tetrahydrofuran is added, with agitation, during 1½ hours. The resultant mixture is maintained at room temperature for 1½ hours longer, then cooled over a period of approximately 15 minutes to around 0°, at which temperature a solution of 5 parts of 5-(6-methoxy-2-naphthyl)-2-oxocyclopentaneacetic acid (M.P. 137–139°) in 70 parts of tetrahydrofuran is added during 45 minutes, agitation being continued throughout. After a further 1½ hours at around 0° with agitation, the mixture is allowed to warm to room temperature overnight; at which point agitation is discontinued and the mixture is stripped of solvent by vacuum distillation. The residue is hydrolyzed by slowly adding thereto a solution of 37 parts of concentrated sulfuric acid in 80 parts of water. The mixture thus obtained is extracted with ether. The ether extract is washed with water, extracted with aqueous 5% sodium bicarbonate, then washed with water and finally with saturated aqueous sodium chloride. It is thereupon dried over anhydrous sodium sulfate and freed of solvent by vacuum distillation. The oily residue is further purified by chromatography on silica gel, using benzene and ethyl acetate as developing solvents. From eluates comprising 98% benzene and 2% ethyl acetate, on evaporation of solvent, there is obtained a solid product which, recrystallized from a mixture of ethyl acetate and hexane, melts at 83–87°. This material is 2-ethynyl-2-hydroxy-5-(6-methoxy-2-naphthyl)cyclopentaneacetic acid lactone, of the formula

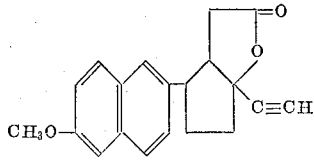

B. *2-ethynyl-2-hydroxy-5-(6-methoxy-2-naphthyl)cyclopentaneacetic acid.*—Acidification of the bicarbonate extract obtained during the process of the preceding Part A of this example causes precipitation of a solid which is filtered off and further purified by chromatography on silica gel, using benzene and ethyl acetate as developing solvents. From eluates comprising 90% benzene and 10% ethyl acetate, on evaporation of solvent, there is obtained as the residue 2-ethynyl-2-hydroxy-5-(6-methoxy-2-naphthyl)cyclopentaneacetic acid, of the formula

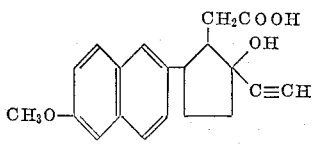

This hydroxy acid is composed of enantiomorphs individually diastereomeric with those which composed the hydroxy acid obtained by hydrolysis of the lactone described in the preceding Part A of this example.

EXAMPLE 14

*2 - acetoxy-5-(6-methoxy-2-naphthyl)cyclopentaneacetyl chloride.*—A mixture of 3 parts of 2-acetoxy-5-(6-methoxy-2-naphthyl)cyclopentaneacetic acid (M.P. 153–154°) and 15 parts of oxalyl chloride is heated at 60° for 2 minutes and then let stand at room temperatures for 1½ hours. Solvent is thereupon removed by vacuum distillation, and the solid residue is recrystallided from benzene. Colorless plates of 2-acetoxy-5-(6-methoxy-2-naphthyl) cyclopentaneacetyl chloride melting at 111.5–115° are obtained.

B. *Diazomethyl 2-acetoxy-5-(6-methoxy-2-naphthyl)cyclopentaneacetate.*—To a mixture of 30 parts of 2-acetoxy-5 - (6-methoxy-2-naphthyl)cyclopentaneacetyl chloride (M.P. 111.5–115°) and 1400 parts of ether is added 54 parts of diazomethane dissolved in 1750 parts of ether. The resultant mixture is cooled at around 5° for 4 hours and then filtered. The filtrate is stripped of solvent by vacuum distillation; the residual oil crystallizes on standing. The solid product thus obtained is diazomethyl 2-acetoxy - 5 - (6-methoxy-2-naphthyl)cyclopentaneacetate melting at 93–98°.

C. *Methyl 2 - acetoxy-5-(6-methoxy-2-naphthyl)cyclopentanepropionate.*—To a solution of 16 parts of diazomethyl 2-acetoxy-5-(6-methoxy-2-naphthyl)cyclopentaneacetate (M.P. 93–98°) in 240 parts of methanol is added, during 15 minutes and in 4 equal portions, a slurry of silver oxide freshly prepared from 5 parts of silver nitrate and aqueous 5% sodium hydroxide, the oxide being slurried in 240 parts of methanol. When the addition is complete, the reaction mixture is heated at the boiling point under reflux for ¾ hour, then cooled and filtered. The filtrate is freed of solvent by distillation, and the residue is extracted with ether. Upon evaporation of solvent from the ether extract, a viscous yellow-orange oil is obtained. The oil is chromatographed on silica gel, using benzene and ethyl acetate as developing solvents. From eluates comprising 95% benzene and 5% ethyl acetate, upon evaporation of solvent, there is obtained a residue which, recrystallized from a mixture of ether and pentane, melts at 67.5–69.5°. The colorless densely-packed platelets thus obtained are methyl 2-acetoxy-5-(6-methoxy-2-naphthyl)cyclopentanepropionate, of the formula

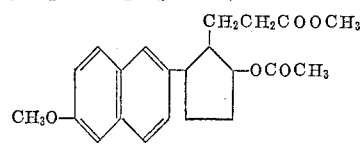

EXAMPLE 15

*2-hydroxy-5-(6-methoxy - 2 - naphthyl)cyclopentanepropionic acid.*—A mixture of 1 part of methyl 2-acetoxy-5-(6-methoxy-2-naphthyl)cyclopentanepropionate (M.P. 67.5–69.5°) and 24 parts of a 5% aqueous solution of sodium hydroxide is heated at the boiling point under reflux in an atmosphere of nitrogen for 1½ hours, during which time complete solution occurs. The solution is chilled to around 10° and acidified with 5% hydrochloric acid at this temperature. The solid product thrown down is collected on a filter, washed thereon with water, and dried in air. Recrystallized from a mixture of benzene and hexane, it melts at 124–127°. The tan, morphologically nondescript crystals thus obtained are 2-hydroxy-5-(6-methoxy-2-naphthyl)cyclopentanepropionic acid, of the formula

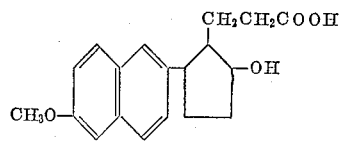

EXAMPLE 16

*Methyl 2-hydroxy-5-(6-methoxy-2-naphthyl)cyclopentanepropionate.*—To 16 parts of 2-hydroxy-5-(6-methoxy-2-naphthyl)cyclopentanepropionic acid (M.P. 124–127°) is added 68 parts of diazomethane dissolved in 1750 parts of ether. The resultant mixture is cooled at 0–5° for 3 hours, then stripped of solvent by vacuum distillation. The viscous yellow oil obtained as the residue is methyl 2-hydroxy-5-(6-methoxy-2-naphthyl)cyclopentanepropionate, of the formula

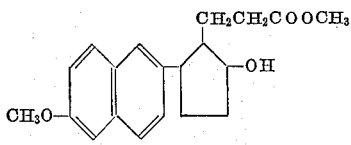

EXAMPLE 17

*Methyl 5-(6-methoxy-2-naphthyl)-2-oxocyclopentanepropionate.*—To a mixture of 20 parts of chromium trioxide with 200 parts of pyridine is added a solution of 16 parts of the methyl 2-hydroxy-5-(6-methoxy-2-naphthyl)cyclopentane propionate obtained by the procedure of the preceding Example 16, in 200 parts of pyridine. The resultant mixture is let stand at room temperatures for 18 hours, then diluted with 5 volumes of water and extracted with a 1:1 mixture of ether and benzene. The ether-benzene extract is successively washed with water, 5% hydrochloric acid, water, 5% aqueous sodium bicarbonate, water, and saturated aqueous sodium chloride. It is then dried over anhydrous sodium sulfate and stripped of solvent by vacuum distillation. The residual viscous yellow oil is methyl 5-(6-methoxy-2-naphthyl)-2-oxocyclopentanepropionate.

EXAMPLE 18

*5-(6-methoxy-2-naphthyl)-2-oxocyclopentanepropionic acid.*—A mixture of 1 part of methyl 5-(6-methoxy-2-naphthyl)-2-oxocyclopentanepropionate obtained by the procedure of the preceding Example 17, with 30 parts of aqueous 5% sodium hydroxide, is heated at the boiling point under reflux in an atmosphere of nitrogen for 1 hour. The clear solution which results is cooled to around 10° and acidified thereat with 5% hydrochloric acid. The tan solid thrown down is filtered off, washed with water, and dried in air. Recrystallized from ether, using decolorizing charcoal in process, it affords colorless nondescript crystals of 5-(6-methoxy-2-naphthyl)-2-oxocyclopentanepropionic acid, melting at 139–144°.

EXAMPLE 19

A. *2-hydroxy-5-(6-methoxy - 2 - naphthyl) - α,α - diphenylcyclopentaneethanol.*—To a solution of 36 parts of phenylmagnesium bromide in 48 parts of ether is added with agitation during 5 minutes, a solution of 7 parts of methyl 2-hydroxy - 5 - (6-methoxy-2-naphthyl)cyclopentaneacetate (M.P. 71–74°) in 54 parts of benzene. Agitation is continued while the resultant mixture is heated at the boiling point under reflux for 3 hours, whereupon the mixture is hydrolyzed by pouring onto 200 parts of crushed ice and 18 parts of concentrated sulfuric acid. The mixture thus obtained is extracted with benzene; and the benzene extract is washed successively with water, dilute aqueous sodium bicarbonate, and water. It is then dried over anhydrous sodium sulfate and stripped of solvent by vacuum distillation. The oily residue solidifies on trituration with ether, and the solid product thus produced is filtered off and recrystallized from ethyl acetate. The material so obtained is 2-hydroxy-5-(6-methoxy-2-naphthyl)-α,α-diphenylcyclopentaneethanol melting at approximately 154–155°.

B. *3-(6-methoxy - 2 - naphthyl)-2-(β,β-diphenylvinyl)-cyclopentanol.*—A solution of 28 parts of 2-hydroxy-5-(6-methoxy-2-naphthyl) - α,α - diphenylcyclopentaneethanol (M.P. 154–155°) and 1 part of iodine in 360 parts of anhydrous benzene is heated at the boiling point under reflux for 1 hour. It is then cooled and dried over anhydrous sodium sulfate. Distillation of solvent under nitrogen leaves an oil, which crystallizes on standing in the presence of hexane. The crystalline product is filtered off and recrystallized from ethyl acetate to give 3-(6-methoxy - 2 - naphthyl) - 2 - (β,β-diphenylvinyl)cyclopentanol melting at 132–134°.

C. *1-acetoxy - 3 - (6-methoxy - 2 - naphthyl)-2-(β,β-diphenylvinyl)cyclopentane.*—A solution of 8 parts of 3-(6-methoxy - 2 - naphthyl) - 2 - (β,β-diphenylvinyl)cyclopentanol (M.P. 132–134°) in a mixture of 80 parts of pyridine and 50 parts of acetic anhydride is held at room temperatures for 18 hours and then mixed with 1000 parts of ice. The solid which forms is filtered off and taken into ether. The ether solution is washed with water, dried over anhydrous sodium sulfate, and stripped of solvent by vacuum distillation. The residual oil crystallizes upon the addition of a small amount of ether. The ether is removed by filtration, leaving pure 1-acetoxy-3-(6-methoxy-2-naphthyl) - 2 - (β,β-diphenylvinyl)cyclopentane melting at approximately 120–121°.

D. *2-acetoxy-5-(6 - methoxy - 2 - naphthyl)cyclopentanecarboxylic acid.*—To a mixture of 300 parts of acetic acid with a solution of 46 parts of 1-acetoxy-3-(6-methoxy-2-naphthyl) - 2 - (β,β-diphenylvinyl)cyclopentane (M.P. 120–121°) in 150 parts of chloroform is added, with agitation at about 50° during 10 minutes, a solution of 37 parts of chromium trioxide in a mixture of 30 parts of water with 200 parts of acetic acid. The resultant mixture is maintained at 50° for 20 minutes and thereafter while 30 parts of methanol is cautiously introduced, agitation being continued the while. The mixture is then concentrated by vacuum distillation at temperatures below 30° to a viscous residue. The residue is partitioned between benzene and aqueous bicarbonate, and the resultant mixture is filtered. The bicarbonate phase of the filtrate is separated and acidified with dilute hydrochloric acid. The product thus precipitated is 2-acetoxy-5-(6-methoxy-2-naphthyl)cyclopentanecarboxylic acid, of the formula

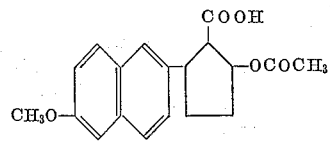

EXAMPLE 20

*2-hydroxy-5-(6-methoxy - 2 - naphthyl)cyclopentanecarboxylic acid.*—The product of the preceding Example 19D is taken up in 400 parts of methanol, and to the methanol solution 100 parts of aqueous 50% potassium hydroxide is added. The resultant mixture is heated at the boiling point under reflux for 30 minutes, then cooled and diluted with 2500 parts of water. Upon acidification with dilute hydrochloric acid, the desired 2-hydroxy-5-(6-methoxy-2-naphthyl)cyclopentanecarboxylic acid is precipitated. The product has the formula

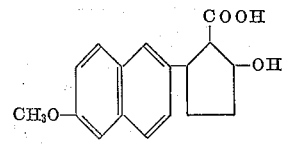

EXAMPLE 21

*5-(6-methoxy - 2 - naphthyl) - 2 - oxocyclopentanecarboxylic acid.*—To a solution of 28 parts of 2-hydroxy-5-(6-methoxy-2-naphthyl)cyclopentanecarboxylic acid prepared by the procedure of the preceding Example 20, in 1600 parts of acetone is added, with agitation at 20°, a solution of 7 parts of chromium trioxide in 42 parts of 30% sulfuric acid. Agitation of the resultant mixture at 20° is continued for 15 minutes, whereupon 8 parts of 2-propanol followed by 5000 parts of water is stirred in. The solution thus obtained is concentrated by vacuum distillation at temperatures less than 30° until all of the acetone is removed, whereupon it is chilled. The product thrown down is 5-(6-methoxy-2-naphthyl)-2-oxocyclopentanecarboxylic acid.

EXAMPLE 22

*Methyl 5-(6-methoxy-2-naphthyl)-2-oxocyclopentanecarboxylate.*—To a mixture of 4 parts of the 5-(6-methoxy-2-naphthyl)-2-oxocyclopentanecarboxylic acid prepared by the procedure of the preceding Example 21, with 70 parts of anhydrous ether is added, during agitation at 0–5°, a solution of 3 parts of diazomethane in 140 parts of anhydrous ether. The resultant mixture is held at 0–5° for 45 minutes, whereupon solvent is removed by distillation in an atmosphere of nitrogen. The residue is the desired methyl 5-(6-methoxy-2-naphthyl)-2-oxocyclopentanecarboxylate.

What is claimed is:

1. A compound selected from the group consisting of (a) hydroxy acids and their esters, having the formula

[Structural formula: naphthalene ring with XO– substituent, linked to cyclopentane bearing $(CH_2)_n$–COOM, OZ, and R groups]

wherein X represents a member of the group consisting of hydrogen and lower alkyl radicals; M represents a member of the group consisting of hydrogen and lower alkyl and di(lower alkyl)amino(lower alkyl) radicals; $n$ represents a member of the group consisting of 0 and positive integers less than 3; Z represents a member of the group consisting of hydrogen and lower alkanoyl radicals; and R represents a member of the group consisting of hydrogen and lower alkyl, methoxycarbonylmethyl, and ethynyl radicals; and (b) corresponding lactones of the formula

[Structural formula: naphthalene ring with XO– substituent, linked to cyclopentane fused with lactone ring $(CH_2)_m$–C=O, O, R]

wherein $m$ represents a positive integer less than 3 and X and R are defined as hereinabove.

2. 2-hydroxy-5-(6-methoxy-2-naphthyl)cyclopentane acetic acid lactone.

3. A compound of the formula

[Structural formula: $CH_3O$–naphthalene–cyclopentane with $(CH_2)_m$COO-lower alkyl and –OH]

wherein $m$ represents a positive integer less than 3.

4. Methyl 2-hydroxy-5-(6-methoxy-2-naphthyl)cyclopentaneacetate.

5. A compound of the formula

[Structural formula: $CH_3O$–naphthalene–cyclopentane with $CH_2COO$-Alk-N(lower alkyl)$_2$ and –OH]

wherein Alk represents an alkylene radical containing fewer than 4 carbon atoms.

6. 2-diethylaminoethyl 2-hydroxy-5-(6-methoxy-2-naphthyl)cyclopentaneacetate.

7. A compound of the formula

[Structural formula: $CH_3O$–naphthalene–cyclopentane with $(CH_2)_m$–COO-lower alkyl and –OCO-lower alkyl]

wherein $m$ represents a positive integer less than 3.

8. Methyl 2-acetoxy-5-(6-methoxy-2-naphthyl)cyclopentaneacetate.

9. 2-hydroxy-5-(6-methoxy-2-naphthyl)-2-methylcyclopentaneacetic acid lactone.

10. 2-hydroxy-2-methoxycarbonylmethyl-5-(6-methoxy-2-naphthyl)cyclopentaneacetic acid lactone.

11. 2-ethynyl-2-hydroxy-5-(6-methoxy-2-naphthyl)cyclopentaneacetic acid lactone.

References Cited in the file of this patent

UNITED STATES PATENTS

| | | |
|---|---|---|
| 2,084,731 | Gyr et al. | July 30, 1934 |
| 2,258,977 | Dickey et al. | Sept. 22, 1939 |
| 2,566,225 | Mackay | May 1, 1947 |

OTHER REFERENCES

Webster's 3rd New International Unabridged Dictionary (1961) page 54.

Eglinton et al.: Jour. Amer. Chem. Soc., vol. 78 (1956), pages 2331–5.

Grinenko et al.: Chemical Abstracts (1957), vol. 51, page 14769.